United States Patent [19]
Lin et al.

[11] Patent Number: 5,910,333
[45] Date of Patent: Jun. 8, 1999

[54] PHOSPHOR PARTICLE WITH ANTIREFLECTION COATING

[75] Inventors: Chie-Ching Lin, Taichung; Kuang-Lung Tsai, Hsinchu, both of Taiwan; Lyuji Ozawa, Hopewell Junction, N.Y.

[73] Assignee: Industrial Technology Research Institute, Hsin-Chu, Taiwan

[21] Appl. No.: 09/090,355

[22] Filed: Jun. 4, 1998

Related U.S. Application Data

[62] Division of application No. 08/796,333, Feb. 7, 1997, Pat. No. 5,792,509.

[51] Int. Cl.$^6$ ............................... B05D 5/06; C23C 14/34
[52] U.S. Cl. ........................... 427/69; 427/215; 427/255; 427/255.2; 427/255.3; 427/242; 204/192.26; 204/192.22
[58] Field of Search ............................... 427/69, 215, 255, 427/255.2, 255.3, 242; 204/192.26, 192.22

[56] References Cited

U.S. PATENT DOCUMENTS

| | | | |
|---|---|---|---|
| 4,855,189 | 8/1989 | Simpoulos et al. | 428/690 |
| 4,999,219 | 3/1991 | Klinedinst et al. | 427/69 |
| 5,049,408 | 9/1991 | Klinedinst et al. | 427/69 |
| 5,118,529 | 6/1992 | Klinedinst et al. | 427/213 |
| 5,418,062 | 5/1995 | Budd | 428/403 |
| 5,433,888 | 7/1995 | Okada et al. | 252/301.4 |
| 5,441,774 | 8/1995 | Dutta et al. | 427/476 |

*Primary Examiner*—Jaynce Bell
*Attorney, Agent, or Firm*—George O. Saile; Stephen B. Ackerman

[57] ABSTRACT

Improved luminous efficiency in plasma displays has been achieved by coating phosphor particles with a dielectric layer having a refractive index, for the ultraviolet light emitted by the plasma, that is intermediate between that of the phosphor and vacuum. When deposited in a thickness range between 0.5 and 5 microns, the layer causes the particle's reflectivity to be reduced because of reduced reflection at the vacuum-coating interface as well as internal reflection at the coating-vacuum interface. For coating thicknesses in the range of 0.1 to 0.5 microns, reflectivity is reduced because of interference between rays reflected at the vacuum-coating interface and the coating-phosphor interface. Several methods for forming these antireflection coatings are described. These include CVD, PVD, and suspension in molten dielectric followed by decanting onto either sticky or non-stick surfaces.

7 Claims, 3 Drawing Sheets

PHOSPHOR PARTICLE WITH ANTIREFLECTION COATING

This is a division of patent application Ser. No. 08/796,333, filing date Feb. 7, 1997, now U.S. Pat. No. 5,792,509, Phosphor Particle With Antireflection Coating, assigned to the same assignee as the present invention.

BACKGROUND OF THE INVENTION

(1) Field of the Invention

The invention relates to the general field of photoluminescent coatings, particularly as used in plasma displays.

(2) Description of the Prior Art

In plasma displays, most of the light that is generated by the gas discharge of the display is in the ultraviolet (UV) region. Some of this is converted to visible light through use of a photoluminiscent coating on the inside surface of the viewing screen. In the conventional arrangements associated with the prior art, much of the ultraviolet radiation that strikes the photoluminescent phosphor particles is reflected from their surfaces and is then lost to the display. Thus, the luminous efficiency of current plasma displays is typically between about 0.3 and 3.5%.

FIG. 1 illustrates this problem of undesired UV reflection. Phosphor particles, such as 1, form a layer on the inside surface of viewing screen 2. A ray of UV light 4 from gas plasma 3 strikes phosphor particle 5. Some of the UV is reflected as ray 6 while the rest penetrates the phosphor where photoluminescence occurs and visible light rays 7 are emitted. Clearly, if ways can be found to reduce the reflectivity of the phosphor particles at the wavelengths concerned, greater luminous efficiency of the display will result.

The present invention teaches use of a suitable dielectric coating on each of the phosphor particles as a way to reduce phosphor reflectivity in the UV. Although we have not found any prior art that describes this approach to the problem, there is mention in the prior art of coating phosphor particles:

Budd (U.S. Pat. No. 5,418,062 May 1995) coats electroluminescent phosphor particles with a view to protecting them against moisture during subsequent use. Possible effects on the reflectivity of the particles are not discussed since reflectivity of the particles is unimportant in electroluminescence. Budd uses Chemical Vapor Deposition (in a temperature range between 25 and 170° C.) as the preferred method for coating the particles with an oxide layer between about 0.1 and 3 microns thick. There is no attempt made to control the thickness of the coating. In an attempt to coat the particles uniformly, particles are subjected to continuous agitation, using a fluidized bed, during CVD.

Okada et al. (U.S. Pat. No. 5,433,888 July 1995) coat phosphor particles primarily for adhesive purposes. As an additional benefit, the adhesive layer is a water soluble rare earth compound that leads to improved luminous flux conditions. Their coatings are formed by suspending their phosphor particles in an aqueous solution, applying this solution to a surface, and then baking to dryness.

Dutta et al. (U.S. Pat. No. 5,441,774 August 1995) use a liquid polymer as a vehicle for conveying phosphor particles onto a surface. The polymer is subsequently removed by heating it above its decomposition temperature. No coating remains on the phosphor particles but they end up with good adhesion to the surface.

SUMMARY OF THE INVENTION

It has been an object of the present invention to provide a plasma display and fluorescent lamp that have improved luminous efficiency over the current art.

Another object has been to reduce the amount of ultraviolet light, generated within a plasma display, that is lost through reflection at the surfaces of the phosphor particles.

A still further object of the invention has been to provide methods for coating phosphor particles with an effective antireflective coating.

These objects have been achieved by coating phosphor particles with a dielectric layer having a refractive index, at the wavelength concerned, that is intermediate between that of the phosphor and vacuum. When deposited in a thickness range between 0.5 and 5 microns, the layer causes the particle's reflectivity to be reduced because of reduced reflection at the vacuum-coating interface as well as internal reflection at the coating-vacuum interface. For coating thicknesses in the range of 0.1 to 0.5 microns, reflectivity is reduced because of interference between rays reflected at the vacuum-coating interface and the coating-phosphor interface. Several methods for forming these antireflection coatings are described. These include CVD, PVD, and suspension in molten dielectric followed by decanting onto either sticky or non-stick surfaces.

DESCRIPTION OF THE PREFERRED EMBODIMENTS

When light emerging from air or vacuum strikes the surface of a material at normal incidence and said material has a refractive index of n, the reflectivity $R_u$ (the u denoting that the surface is uncoated) is given by:

$$R_u = \frac{(n-1)^2}{(n+1)^2}$$

Figure 1:
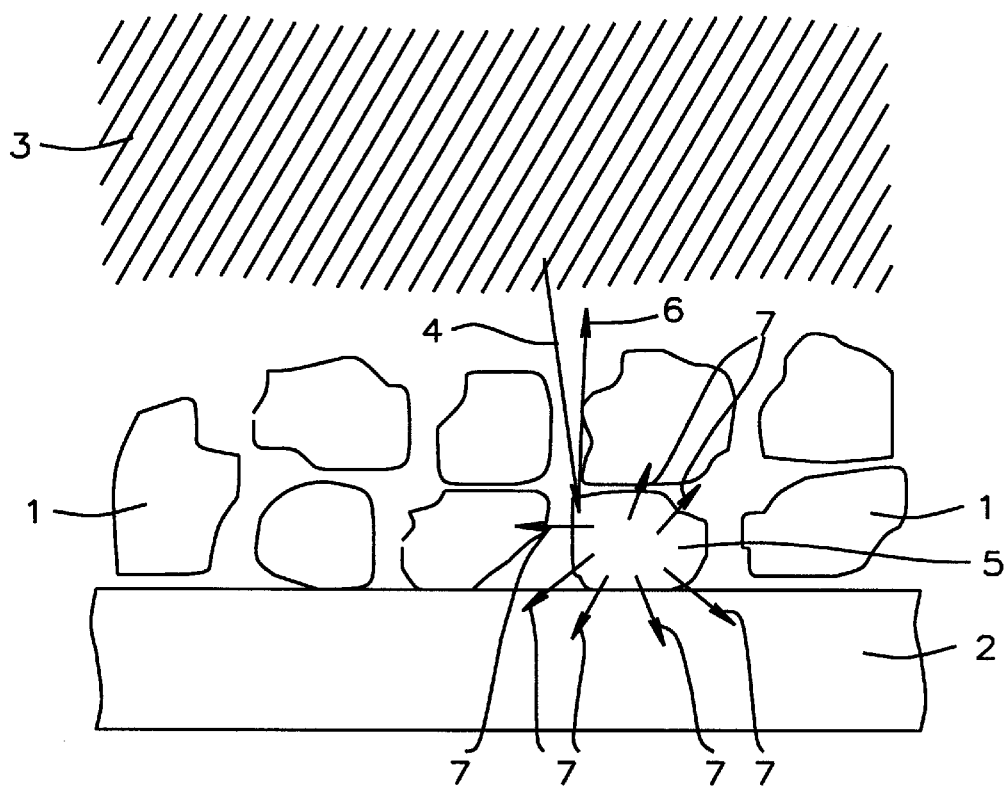
FIG. 1 shows how ultraviolet light from a plasma can be reflected off the surface of phosphor particles so that only a fraction of it is available for photoluminescence.
Figure 3:
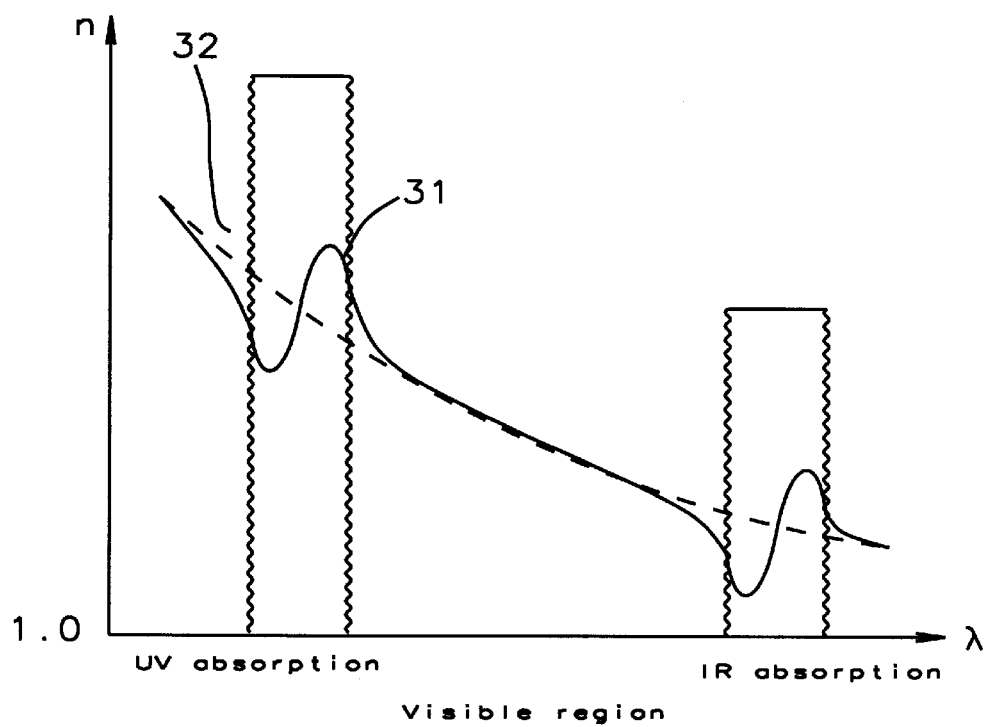
FIG. 3 is a curve of refractive index vs. wavelength including regions of anomalous dispersion in both the UV and IR.

If the wavelength of the light is close to an absorption edge, the refractive index can be very high. This is illustrated in FIG. 3 below. Curve 32 shows how refractive index gradually increases with decreasing wavelength (normal dispersion). Curve 31 illustrates the abrupt rise and subsequent abrupt fall of the refractive index in the vicinity of an absorption edge (anomalous dispersion). Thus, for example, for UV having a wavelength of about 2,000 Angstroms the refractive index of europium doped yttrium oxide is greater than 5, leading to a value of $R_u$ greater than 0.5. As already discussed relative to FIG. 1, such a high reflectivity can lead to a substantial reduction in luminous efficiency.

Figure 2A:
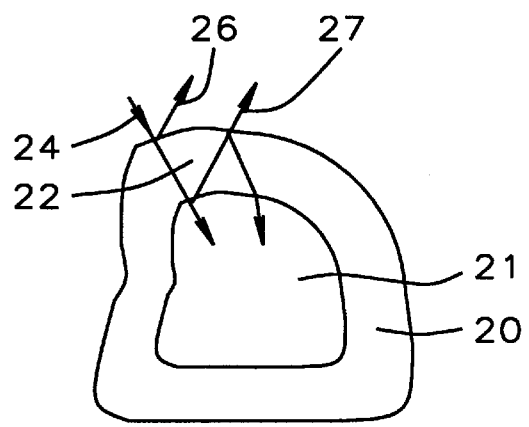
FIGS. 2a and 2b illustrate how a relatively thick or a relatively thin coating of a dielectric on a phosphor particle can reduce its reflectivity.

Consider now FIG. 2a which shows phosphor particle 21, having refractive index $n_p$, coated with relatively thick dielectric layer 20 having refractive index $n_c$. Arriving UV ray 24 strikes the outer surface of coating 20 and is partially reflected as ray 26, the remaining light going on to the coating-phosphor interface where it is once again partially reflected as ray 22, the unreflected component entering the phosphor where photoluminescence occurs. Ray 22 is itself partially internally reflected at the coating-vacuum interface emerging as attenuated ray 27. By definition, layer 20 is thick enough so that any coherence between rays 26 and 27 has been lost and interference between them is not a factor in determining the reflectivity.

Thus, the reflectivity $R_c$ of coated particle 21 is the sum of the reflectivities at the vacuum-coating and the coating-phosphor interfaces less the amount returned to the interior by internal reflection at the coating-vacuum interface:

$$R_c = \frac{(n_c - 1)^2}{(n_c + 1)^2} + \frac{(n_p - n_c)^2}{(n_p + n_c)^2} - \frac{(n_c - 1)^2}{(n_c + 1)^2} \cdot \frac{(n_p - n_c)^2}{(n_p + n_c)^2}$$

For example, for a UV wavelength of 1,470 Angstroms, for $n_c=2.75$ and $n_p=6.75$, we would reduce the reflectivity from 0.55 to 0.35 (at normal incidence).

Figure 2B:
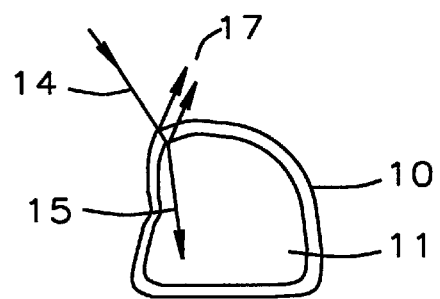

In FIG. 2b we consider the case of a relatively thin anti-reflective coating. Phosphor particle 11 has been coated with dielectric layer 10. UV ray 14 striking the particle is reflected at both the vacuum-coating and coating-phosphor interfaces. By definition, layer 10 is thin enough so these two reflected rays are coherent and interference between them will occur. If the interference is fully destructive all of ray 14 enters the particle as ray 15 and the reflected ray 17 is eliminated.

The conditions for complete interference (zero reflectance) at normal incidence are:

$$(n_c)^2 = n_p$$

and $$T_c = w/4n_c$$

where $T_c$ is coating thickness and w is wavelength.

Thus, unlike the thick coating case illustrated in FIG. 2a, control of coating thickness is important for the thin coating case. For example, for a UV wavelength of 1,470 Angstroms, $n_c=2.75$ and $n_p=6.75$, a thickness of 1336 Angstroms would be needed to achieve zero relectivity (at normal incidence).

In the following examples we will discuss several different methods to effectively coat the phosphor particles, including comments on the degree of thickness control associated with each method.

EMBODIMENT NO. 1

Figure 4:
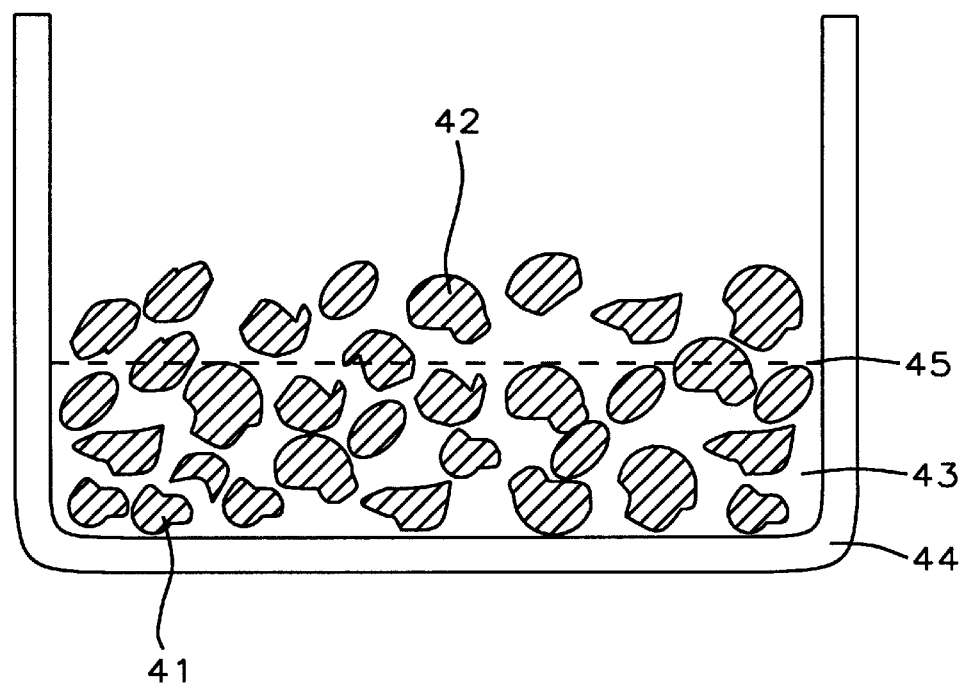
FIGS. 4, 5 and 6 are steps in a method for coating phosphor particles with a layer of dielectric.

Referring now to FIG. 4, the method of this embodiment begins with forming a suspension the phosphor particles, such as 41, in molten dielectric 43, contained in crucible 44. The level of liquid is chosen so that a small number of the particles, such as 42, lie above liquid surface 45. For phosphors such as europium doped yttrium oxide or manganese doped zinc silicate or europium doped barium magnesium aluminum oxide, suitable dielectrics would include silicon oxide, indium phosphide, lead fluoride, sodium fluoride, potassium chloride, indium arsenide, indium antimonide, gallium phosphide, calcium fluoride, barium fluoride, and glass and the temperature of the molten dielectric would be in the range of from about 600 to 1,500° C.

Figure 5:
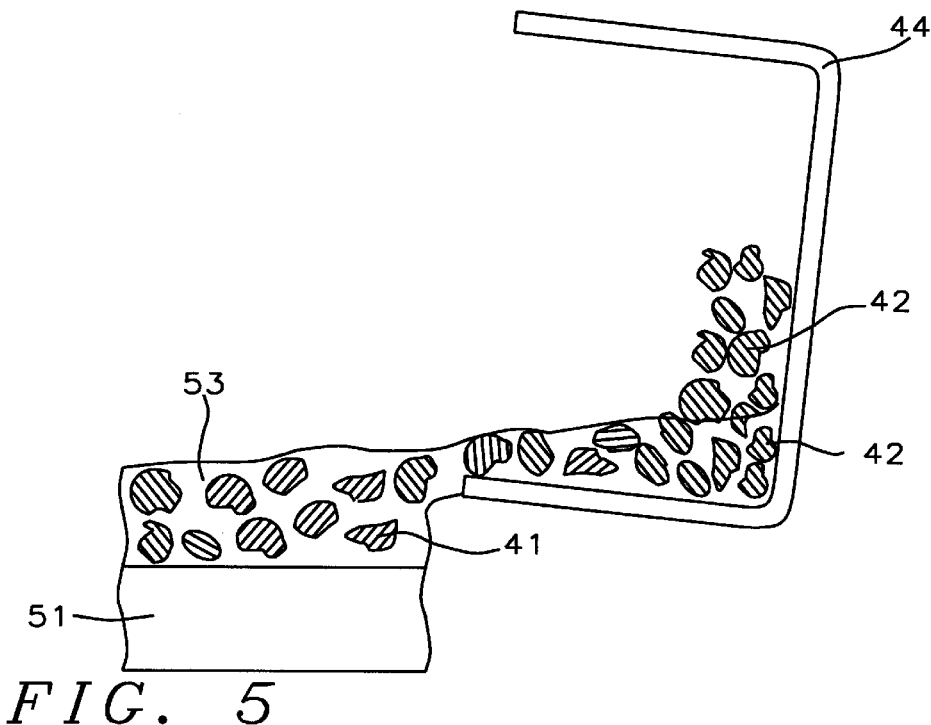

Referring to FIG. 5, the molten dielectric 53 is poured onto substrate 51, chosen so that it is wetted by 53. Examples of suitable substrate materials include silica and alumina. Thus a layer, between about 1 and 5 microns thick, of dielectric in which phosphor particles, such as 41, are trapped in suspension is formed on substrate 51. This layer is allowed to cool in place and can then be used directly as a photoluminescent layer for the plasma display.

For this embodiment, the effective thickness of the dielectric coating around each phosphor particle will vary over a wide range (between about 1 and 5 microns) and no attempt is made to control it precisely. However, by keeping the liquid level slightly below the minimum needed to cover all the particles, some particles, such as 42, remain behind in crucible 44. This eliminates the possibility of a non-functional layer of clear dielectric being formed above the phosphor particles.

EMBODIMENT NO. 2

As with embodiment no. 1, the method of this embodiment begins with forming a suspension of the phosphor particles, such as 41, in molten dielectric 43, contained in crucible 44 (as seen in FIG. 4) except that the level of liquid is such that all the particles will now be covered. For phosphors such as europium doped yttrium oxide or manganese doped zinc silicate or europium doped barium magnesium aluminum oxide, suitable dielectrics would include silicon oxide, indium phosphide, lead fluoride, sodium fluoride, potassium chloride, indium arsenide, indium antimonide, gallium phosphide, calcium fluoride, barium fluoride, and glass and the temperature of the molten dielectric would be in the range of from about 600 to 1,500° C.

Figure 6:
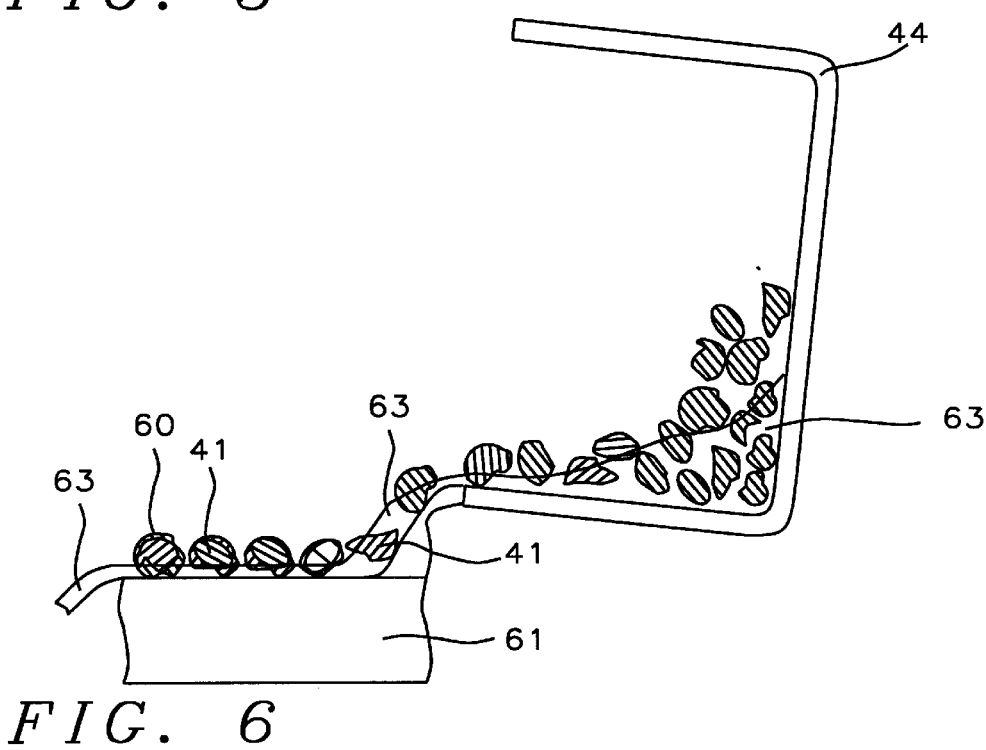

Referring to FIG. 6, the molten dielectric 63 is poured onto substrate 61, chosen so that it is not wetted by 63. Examples of suitable substrate materials include silica and alumina. Since wetting does not occur, most of liquid 63 runs off, leaving behind the phosphor particles, such as 41, each with layer 60 of the dielectric on its surface. The final step in the method of this embodiment is allowing the substrate and coated particles to cool to room temperature.

For this embodiment, the effective thickness of the dielectric coating around each phosphor particle will vary to some extent, typically in the range of from about 1 to about 5 microns, and no attempt is made to control it precisely.

EMBODIMENT NO. 3

In this embodiment, the phosphor particles are coated by means of Chemical Vapor Deposition (CVD). Conventional means for performing CVD are provided, including a reaction chamber and the appropriate reactant materials that, when combined and heated, will deposit a layer of the desired dielectric material (such as barium fluoride or magnesium fluoride etc.) on all exposed surfaces, including phosphor particles such as europium doped yttrium oxide, manganese doped zinc silicate, or europium doped barium magnesium aluminum oxide. Once the particles have been placed inside the reaction chamber the deposition process is initiated. Throughout deposition the phosphor particles are continuously tumbled to ensure that the coating that each particle receives is uniform and of a controllable thickness. Once a layer of dielectric of the desired thickness has been deposited on the particles, the reaction is terminated.

Thickness control when using embodiment 3 can be quite precise and coatings of thickness ranging from about 0.1 to 1 micron can be formed.

EMBODIMENT NO. 4

In this embodiment, the phosphor particles are coated by means of vacuum evaporation, which is one form of Physical Vapor Deposition (PVD). Conventional means for performing vacuum evaporation are provided, including a vacuum chamber and a source in which the desired dielectric material (such as magnesium oxide or magnesium fluoride etc.) gets heated and from which it evaporates onto all surfaces in the line of sight, including phosphor particles such as europium doped yttrium oxide, manganese doped zinc silicate, or europium doped barium magnesium aluminum oxide. After the particles have been placed inside the vacuum chamber the deposition process is initiated. Throughout deposition the phosphor particles are continuously tumbled to ensure that the coating that each particle receives is uniform and of a controllable thickness. Once a layer of dielectric of the desired thickness has been deposited on the particles, the process is terminated.

Thickness control when using embodiment 4 can be very precise and coatings of thickness ranging from about 0.1 to 1 micron can be formed.

EMBODIMENT NO. 5

In this embodiment, the phosphor particles are coated by means of sputtering which is another form of PVD. Conventional means for performing the sputtering, which may be reactive sputtering or RF sputtering (or even a combination), are provided, including a vacuum chamber, a controlled source of low pressure gas, such as argon, and a suitable target from which the desired dielectric material (such as magnesium oxide or magnesium fluoride etc.) can be sputtered. Sputtered material deposits onto all surfaces in the approximate line of sight of the target, including phosphor particles such as europium doped yttrium oxide, manganese doped zinc silicate, or europium doped barium magnesium aluminum oxide. After the particles have been placed inside the vacuum chamber the deposition process is initiated. Throughout deposition the phosphor particles are continuously tumbled to ensure that the coating that each particle receives is uniform and of a controllable thickness. Once a layer of dielectric of the desired thickness has been deposited on the particles, the process is terminated.

Thickness control when using embodiment 5 can be very precise and coatings of thickness ranging from about 0.1 to 1 micron can be formed.

While the invention has been particularly shown and described with reference to the preferred embodiments thereof, it will be understood by those skilled in the art that various changes in form and details may be made without departing from the spirit and scope of the invention.

What is claimed is:

1. A method for uniformly coating phosphor particles with a dielectric, comprising:

selecting the phosphor particles from the group consisting of europium doped yttrium oxide, manganese doped zinc silicate, and europium doped barium magnesium aluminum oxide;

selecting the dielectric from the group consisting of magnesium fluoride, barium fluoride, magnesium oxide, indium phosphide, and calcium fluoride;

providing a reaction chamber and reactant materials suitable for a chemical vapor deposition process whereby said dielectric will deposit on all exposed surfaces in the reaction chamber;

placing the particles inside the chamber;

initiating said deposition process while continuously tumbling the particles; and terminating the deposition process when a layer of dielectric of a desired thickness has been deposited on the particles.

2. A method for uniformly coating phosphor particles with a dielectric, comprising:

providing a vacuum chamber;

providing, within the chamber, a source suitable for physical vapor deposition;

placing the particles inside the chamber;

coating the particles by means of physical vapor deposition while continuously tumbling the particles; and terminating physical vapor deposition when a layer of dielectric of a desired thickness has been deposited on the particles.

3. The method of claim 2 wherein physical vapor deposition further comprises vacuum evaporation.

4. The method of claim 2 wherein physical vapor deposition further comprises sputtering.

5. The method of claim 2 wherein the phosphor particles are taken from the group consisting of europium doped yttrium oxide, manganese doped zinc silicate, and europium doped barium magnesium aluminum oxide.

6. The method of claim 2 wherein the dielectric is taken from the group consisting of magnesium fluoride, barium fluoride, magnesium oxide, indium phosphide, and calcium fluoride.

7. The method of claim 2 wherein the thickness of the layer of dielectric is between about 0.1 and 2 microns.

* * * * *